(12) United States Patent
Current

(10) Patent No.: US 11,266,075 B2
(45) Date of Patent: Mar. 8, 2022

(54) STEM BAYONET CLIP

(71) Applicant: Jemma Holdings, LLC, Jersey City, NJ (US)

(72) Inventor: James Current, Jersey City, NJ (US)

( * ) Notice: Subject to any disclaimer, the term of this patent is extended or adjusted under 35 U.S.C. 154(b) by 303 days.

(21) Appl. No.: 16/534,248

(22) Filed: Aug. 7, 2019

(65) Prior Publication Data

US 2020/0045890 A1 Feb. 13, 2020

Related U.S. Application Data

(60) Provisional application No. 62/715,332, filed on Aug. 7, 2018.

(51) Int. Cl.
*A01G 5/04* (2006.01)
*A47G 7/08* (2006.01)
*B65D 85/50* (2006.01)

(52) U.S. Cl.
CPC .............. *A01G 5/04* (2013.01); *A47G 7/085* (2013.01); *B65D 85/505* (2013.01)

(58) Field of Classification Search
CPC . A01G 5/04; A01G 3/02; A47G 7/085; B65D 85/505; A44D 2201/00
See application file for complete search history.

(56) References Cited

U.S. PATENT DOCUMENTS

| | | | | | |
|---|---|---|---|---|---|
| 2,829,469 | A | * | 4/1958 | Gaeta | A01G 5/02 47/55 |
| 3,739,525 | A | * | 6/1973 | Rybak | A01G 17/12 47/44 |
| 4,381,623 | A | * | 5/1983 | Koistinen | A01G 5/06 47/48.5 |
| 5,165,430 | A | * | 11/1992 | Porter | A45D 2/22 132/278 |
| 5,349,780 | A | * | 9/1994 | Dyke | A01G 9/122 24/458 |
| 8,215,057 | B2 | * | 7/2012 | Rosenberg | A01G 5/02 47/41.15 |
| 2015/0282584 | A1 | * | 10/2015 | Boss | A45D 8/34 132/273 |
| 2017/0215543 | A1 | * | 8/2017 | West | A45D 8/34 |

* cited by examiner

*Primary Examiner* — Timothy D Collins
*Assistant Examiner* — Brittany A Lowery
(74) *Attorney, Agent, or Firm* — Travis Lee Johnson; Ascentage Patent Law

(57) ABSTRACT

A stem bayonet clip having a compression portion with opposing main body portions movable with respect to one another; which may include one or more compression ribs provided on interior surfaces of the opposing main body portions; a locking mechanism provided about an edge portion of the opposing main body portions, the locking mechanism being configured to retain a compressive force applied to a stem of a floral element inserted between the opposing main body portions; and a bayonet portion configured to be inserted into floral foam or similar material. The stem bayonet clip configured to grip the stem portion of a flower while the bayonet portion holds the flower in place (in floral foam) as part of a flower arrangement.

19 Claims, 7 Drawing Sheets

STEM BAYONET CLIP

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF THE INVENTION

The present invention relates generally to assembling floral arrangements, and in particular to the placement of fragile or preserved floral stems into an arrangement base.

BACKGROUND OF THE INVENTION

As of yet floral arrangements are typically formed by embedding floral stems or other floral decorations or topiaries into a dense foam base, wherein the foam retains the relative desired position of the flower or other item by retaining the stem within the foam, wherein the foam is usually hidden or covered by additional decorative elements.

It has been recognized by the inventors herein, that often, various floral stems of particular flowers or other ornamentals can be fragile or brittle due to being too thin or due to various preservation techniques. In addition, often, various floral stems of particular flowers or other ornamentals can be too short such that when the floral stems are inserted into the base material the floral element will not be retained in a desired position with respect to the base material and with respect to other elements of the overall arrangement. As such, such floral elements can often break upon insertion into the base material, i.e. foam.

The present embodiments described herein are meant to address the problems described above, as well as others, which will become clear to those skilled in the art upon reading this disclosure.

SUMMARY OF THE INVENTION

These aspects of the invention are not meant to be exclusive and other features, aspects, and advantages of the present invention will be readily apparent to those of ordinary skill in the art when read in conjunction with the following description, appended claims, and accompanying drawings.

In one embodiment, a stem bayonet clip system is comprised of a compression portion having opposing main body portions movable with respect to one another. A locking mechanism can be provided about an edge portion of the opposing main body portions, and can be configured to inhibit movement of the opposing main body portions so as to retain a compressive force applied to the stem of a floral element inserted between the opposing main body portions. These compression keeps the stem of the floral element in place, where a bayonet portion extending downward from the compression portion is formed.

In one variation of the above embodiment the bayonet portion can further comprises a tapered tip portion configured to be inserted into a foam material. This bayonet portion can take on many shapes, and cross-sections, each usually having a tip portion that makes it easily insertable into foam material.

In some embodiments, the bayonet portion further comprises a protective cavity formed on an interior thereof. This can be a hollow portion where a portion of the stem is inserted into or simply for purposes of reducing material in the system.

In some variations to the compression portion, the compression portion can be provided with a provided with a plurality of compression features, some of these features include ribs that are provided at varying axial heights along the inner wall portion of the opposing main body portions. The compression portion can also be formed of or include a tacky or gripping material layer. The compression portion can also include texturing along the surfaces used for compressing stems of floral elements.

With regards to the compression ribs, each can be arranged opposite an opposing compression rib provided on the opposing main body portion at a corresponding axial height.

These plurality of compression ribs in one variation can be oriented in a generally horizontal direction when a tapered tip portion of the bayonet clip is inserted into a foam material.

The compression ribs further comprise one or more texture elements provided thereon including recess and protruding portions.

In another embodiment the stem bayonet clip system can include a second locking mechanism provided at an upper edge of the opposing main body portions.

The stem bayonet clip system can also comprise of a first hinge connecting the opposing main body portions. In some variations this hinge extends the height of the opposing main body portions, while in other variations this hinge portion is positioned in a lower portion section of the opposing main body portions.

In yet another embodiment, a second hinge can be provided connecting the opposing main body portions, wherein the second hinge is provided at an upper portion of the main body portions above the first hinge.

The main body portions can also include one or more flexure slots located on an exterior surface of the compression portion. In one embodiment a flexure slot is located on the exterior surface at a location corresponding to the first hinge. The flexure slots can be configured to allow the main body portions to conform around the stem of a floral element and provide a spring-like force in conjunction with the locking mechanism that provides a compression force on the stem. These flexure slots and the positioning of the locking mechanism along an edge of the compression portion can be configured to create a gradient compression force along the length of the stem. This provides stability and spreads the gripping or compressive forces across a greater portion of the stem.

As mentioned, the locking portion can be formed in multiple places including near a lower portion of the compression portion.

The stem bayonet clip can be formed of a single material or multiple materials including those with varying durometers and that are deformable in design.

In an embodiment, the stem bayonet clip can further comprise a gripping area configured to be gripped between fingers to facilitate the locking of the opposing main body portions and for handling of the inserting of the bayonet portion into floral foam or other types of materials used as a base for floral arrangements.

The gripping area can include a flat portion configured to have a design or logo, which can be drawn, painted, placed or otherwise formed thereon. In some variations the design or logo is either raised or recessed to provide additional gripping features.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

As discussed briefly above various floral elements 10, such as flowers, can include stems 14 which can often be fragile or brittle due to being too thin or due to various preservation techniques, such as freeze drying or chemical treatments. As such, such floral elements can often break upon insertion into a base material, such as floral foam, when trying to create a floral arrangement. Other times, the stems are too short, which provides additional difficulty when inserting into floral foam.

In order to cure these problems of short stems and breaking stems upon insertion into floral foam or other base materials used in floral arrangements, a stem bayonet clip system 100 is provided. The system 100 includes structure for clipping onto or around an end portion of a stem of a floral element, which allows for easier handling of the floral element and provides an additional length or extension of the stem portion. The system 100 includes bayonet portion configured to be inserted into floral foam. The system 100 can then retain a portion of the stem portion and be inserted into the base material for proper retention without the need of pushing the stem itself into the base material. Thus, system 100 provides the retention force between the base material and the stem without fear of damaging the stem itself upon insertion into the base material.

The following list of elements is provided for convenience when referring to each of the FIGS. 1-9.
 Floral Element 10
 Ornamental Portion 12
 Stem 14
 Stem Bayonet Clip System 100 (System)
 Compression Portion 110
 Outer Body 112a-b
 Inner Sidewalls 113a-b
 Compression Rib 114
 Recess Feature 116
 Protrusion Feature 118
 Flexure Slot 120
 Cavity 125
 Front Face 130
 Back Face 132
 Gripping area 134a-b
 Design/Logo 140
 Bayonet 150
 Tapered Portion 154
 Tip 156
 Hinge 160
 Upper Hinge 162
 Locking Structure 170
 Lip 172
 Arm 174
 Recess 176
 Locking Surface 178

Figure 1:
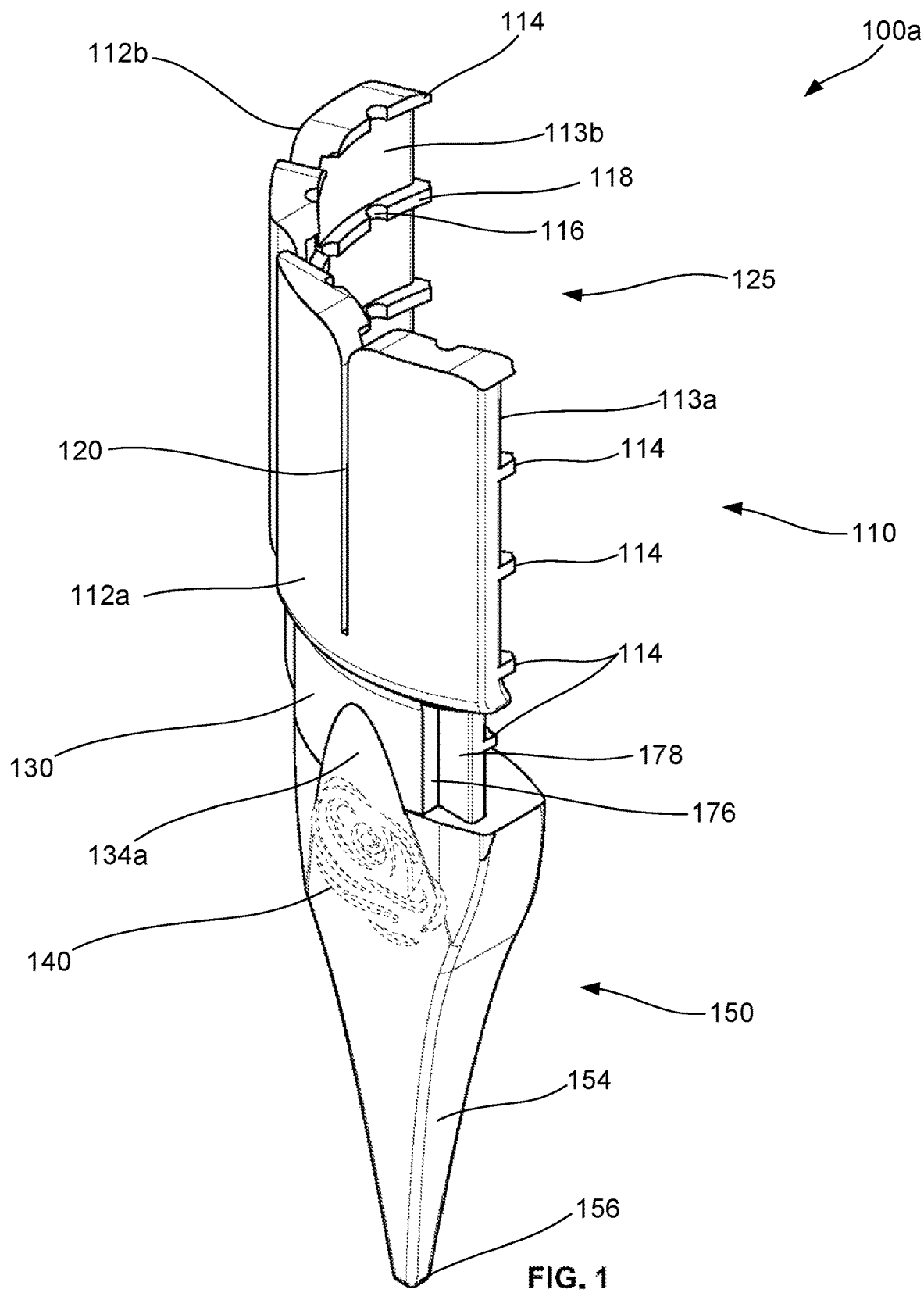
FIGS. 1-7 illustrate various views of an exemplary stem bayonet clip, with the clip portion in the open position.
Figure 2:
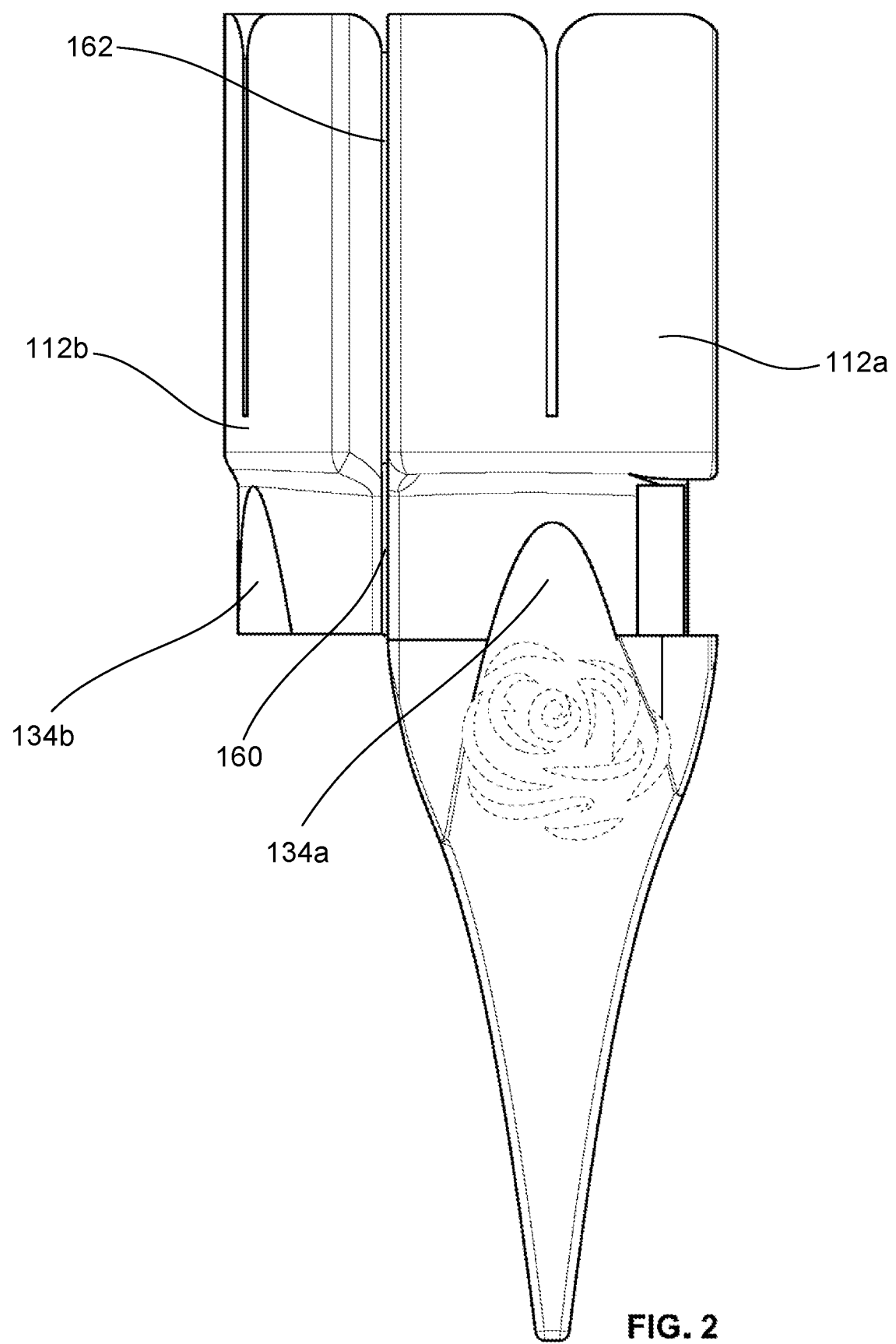
Figure 3:
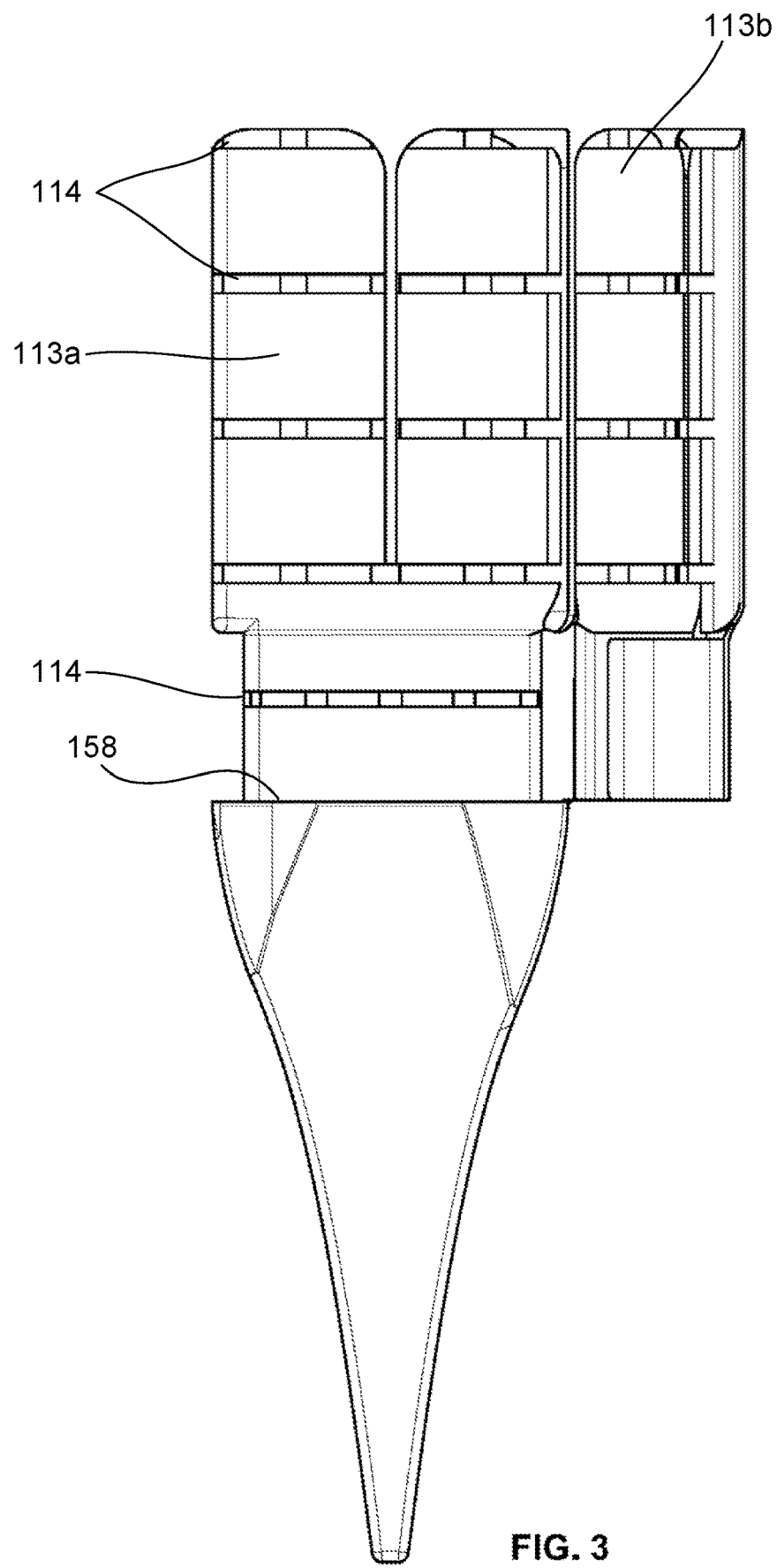
Figure 4:
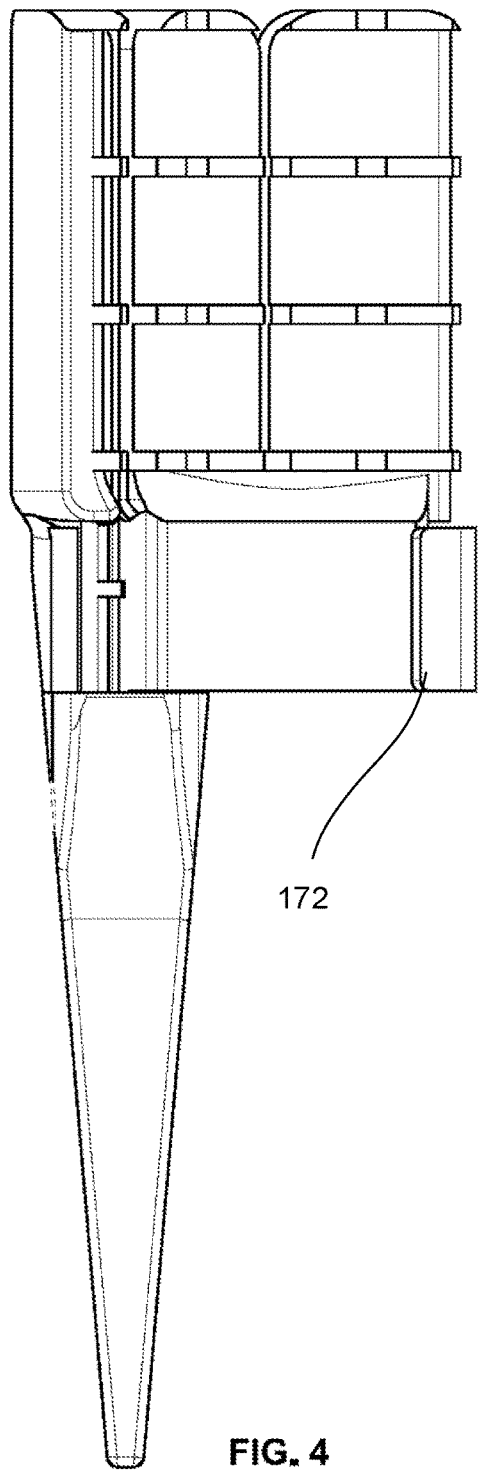
Figure 5:
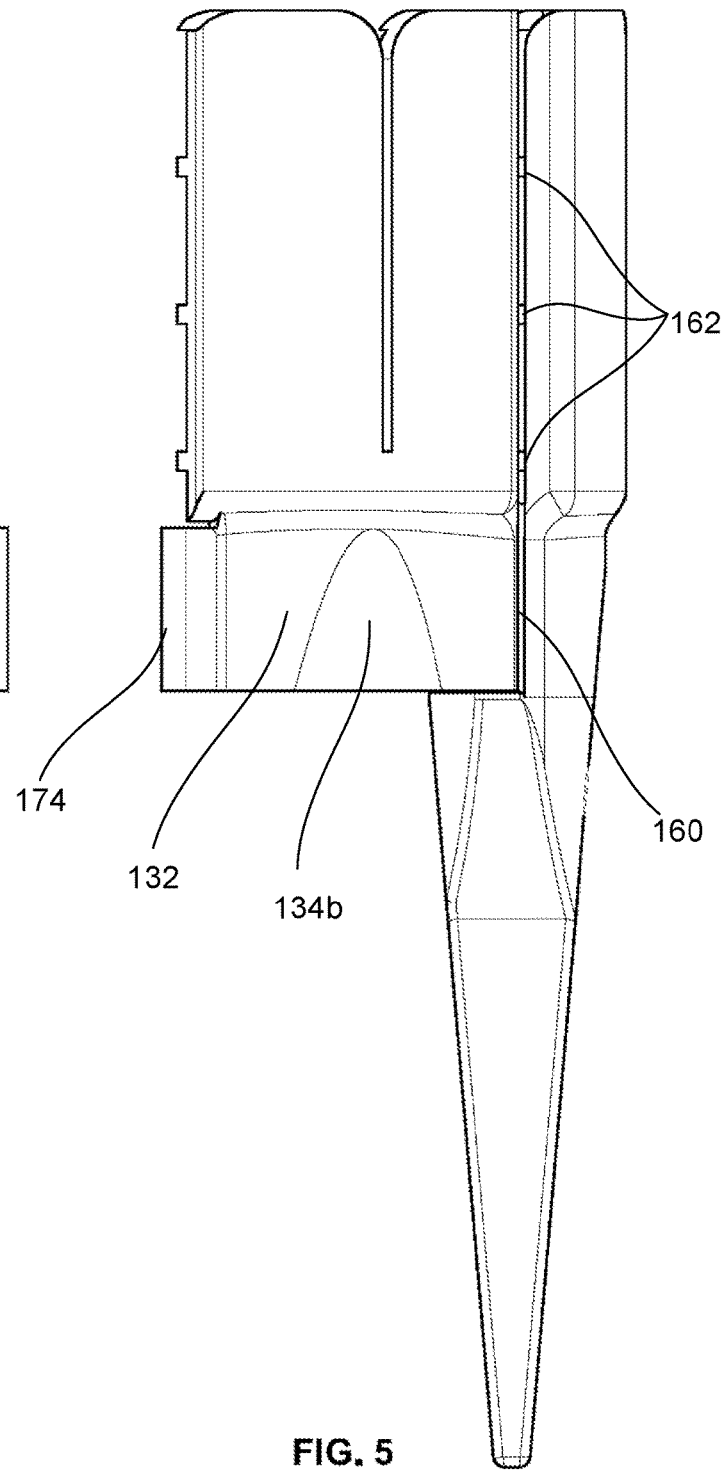
Figure 6:
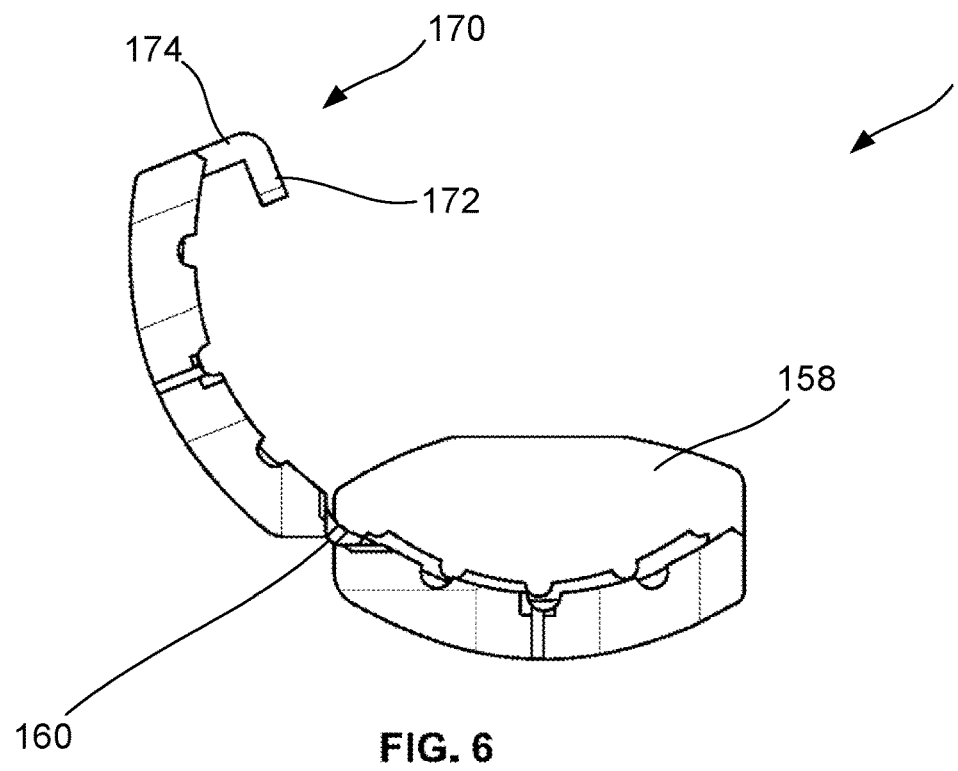
Figure 7:
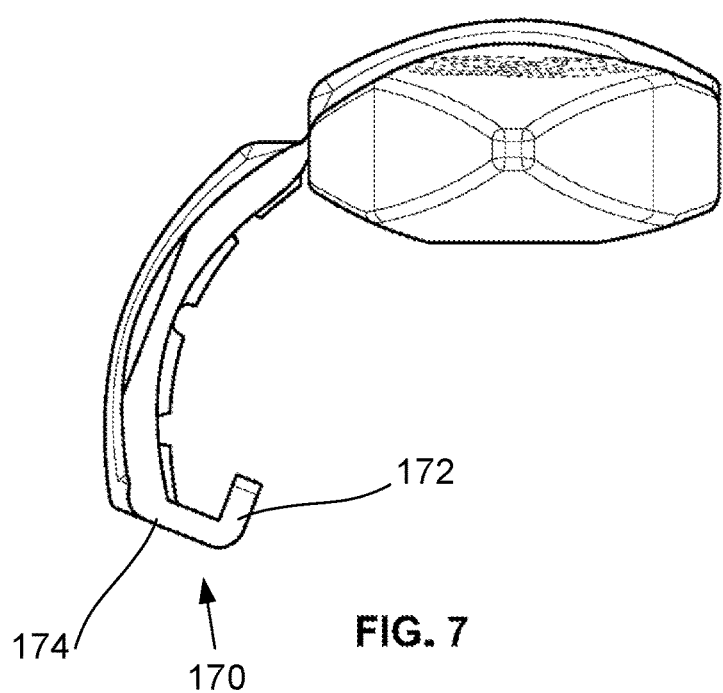

Referring to FIGS. 1-7, these figures illustrate various views of an open configuration of stem bayonet clip system 100. FIG. 1 is a front perspective view, FIG. 2 is a front view, FIG. 3 is a rear view, FIGS. 4-5 are side views, FIG. 6 is a top view and FIG. 7 is a bottom view. As shown in these figures, system 100 utilizes a compression portion 110 which can open and close so as to compress the stem 14 between outer body portions 112a-b. Hinge 160 and Upper Hinge 162 can be disposed between outer body portions 112a and 112b to allow the system 100 to be in an open configuration 100a or as later shown in FIG. 8 in a closed configuration 100b. As shown outer body portion 112a is directly integrated with face 130 and bayonet portion 150, while outer body portion 112b is connected to 112a via hinge 160 and upper hinge 162 so as to allow it to swing in and out. It should be noted that upper hinge(s) 162 can be the upper portion of hinge 160 as shown in FIG. 2, or alternatively include one or more individual hinges, as shown in FIG. 5.

In the embodiment shown, compression ribs 114 are disposed on the inner sidewalls 113a-b of outer body portions 112a-b at various axial locations or distances along the compression portion 110. Each of these compression ribs is optional, but providing the compression ribs can aide in compressing a stem within a cavity portion 125 that is formed between outer body portions 122a-b. Furthermore, providing a plurality of compression ribs 114 aides in compressing stems with varying lengths inside the cavity portion 125. Each of the compression ribs can include recess features 116 and protrusion features 118. These features can further be utilized in gripping the stem of a floral element 10, such as a flower.

In the embodiment shown in FIGS. 1-7, an arrangement of four (4) rows of ribs are positioned along the inner sidewalls 113a-b of outer body portions 112a-b. Though not shown, it is contemplated that other internal features, such as spikes, or other protruding features could be disposed along the inner sidewalls 113a-b to be utilized for the purposes of gripping stem 10. In some variations, roughened or tactile inner sidewalls can also be utilized, where the surface has less prominent features, but is more textured in nature, or alternatively a layer of material suitable for gripping is disposed therein. The compression force of the clip portion 110 can have a significant impact on the need for additional or alternative features as described so far.

To facilitate the compressive nature of compression portion 110 a locking structure 170 is provided to lock or fix the outer body portions 112a-b in the closed configuration 100b. The locking structure 170 can be formed in part by locking arm 174 that has a lip or flange portion 172 that is configured to mate or interferingly engage with locking surface 178. Locking surface 178 is formed of a recess portion of the front face 130, such that when the locking structure 170 is in the locked or closed position the lip 172 is adjacent the front face. The curvature of the lip 172 can be such that it conforms with any curvature of front face 130, so that it looks and feel uniform in nature.

As shown in the embodiments of FIGS. 1-8, the locking structure is formed at the bottom portion of the outer body portions 112a-b creating a locking interface with the front face 130. However, it is also contemplated that the locking structure could be formed near the upper or top portion of outer body portions 112a-b. One of the advantages of having the locking structure near the bottom is that it allows for a gradient compressive force from the lower portion of the stem to the upper portion of stem. This often helps with placing and keeping the stems positioned within the cavity 125 of the system 100. In particular this can aid with placing brittle stems therein, by introducing a gradient compressive force along the stem.

As shown and mentioned above, front face 130 can have a variety of curvatures and include a front-gripping area 134a in conjunction with a back-gripping area 134b on the opposite back face 132. These areas are design to be gripped between fingers, usually the thumb and forefinger for pushing the system 100 into floral foam or some other suitable floral arrangement base material. Disposed on the gripping areas 134a-b can be a design or logo 140, which can be raised in nature to facilitate gripping. Other textures or features can also be disposed therein to facilitate in gripping. Utilizing a design or logo as the gripping features has the added benefit of promoting the brand and functioning as a gripping mechanism.

The bayonet 150 or wedge portion of system 100 is configured to be disposed or pressed into floral foam as mentioned above. As shown, bayonet 150 includes a tapered edge 154 that leads down to a spike portion 156. The tapered edge and spike portion of bayonet 150 help when pushing the bayonet into floral form and staying once pressed into the floral foam. It is contemplated that variations of the type and style of bayonet or wedge portion shown could be utilized and would readily apparent to those skilled in the art upon reading this disclosure. For example, the bayonet 150 could have a more cylindrical and/or conical cross-section and shape. Hooks and other features could be disposed on or about the bayonet.

Additional features include flexure slots 120 that could be disposed down a vertical portion of outer body portions 112a-b. These slots in the shown configuration could be completely pass-through slots or partially formed slots that do not pass all the way through the sidewall of outer body portions 112a-b. The flexure slots can help with the flexing or wrapping around of the outer body portions 112a-b around the stem 10 in a type of clam shell operation.

As noted above, many of the features described herein can be provided with a coating such as silicone or rubber coating.

The material the system 100 is made of can include a variety of plastics or metal materials. In many variations, the material and in particular the material associated with the hinge and the locking structure can have deformative properties that allow for hinging and interfering engagement.

A base portion 158 sits at the upper portion of the bayonet 150 and bottom of cavity 125. As shown, the base portion 158 is a primarily flat surface, but in embodiments, such as the provisional application from which that claims priority, the base portion 158 could include an additional slot, cavity, or otherwise be hollow.

Figure 8:
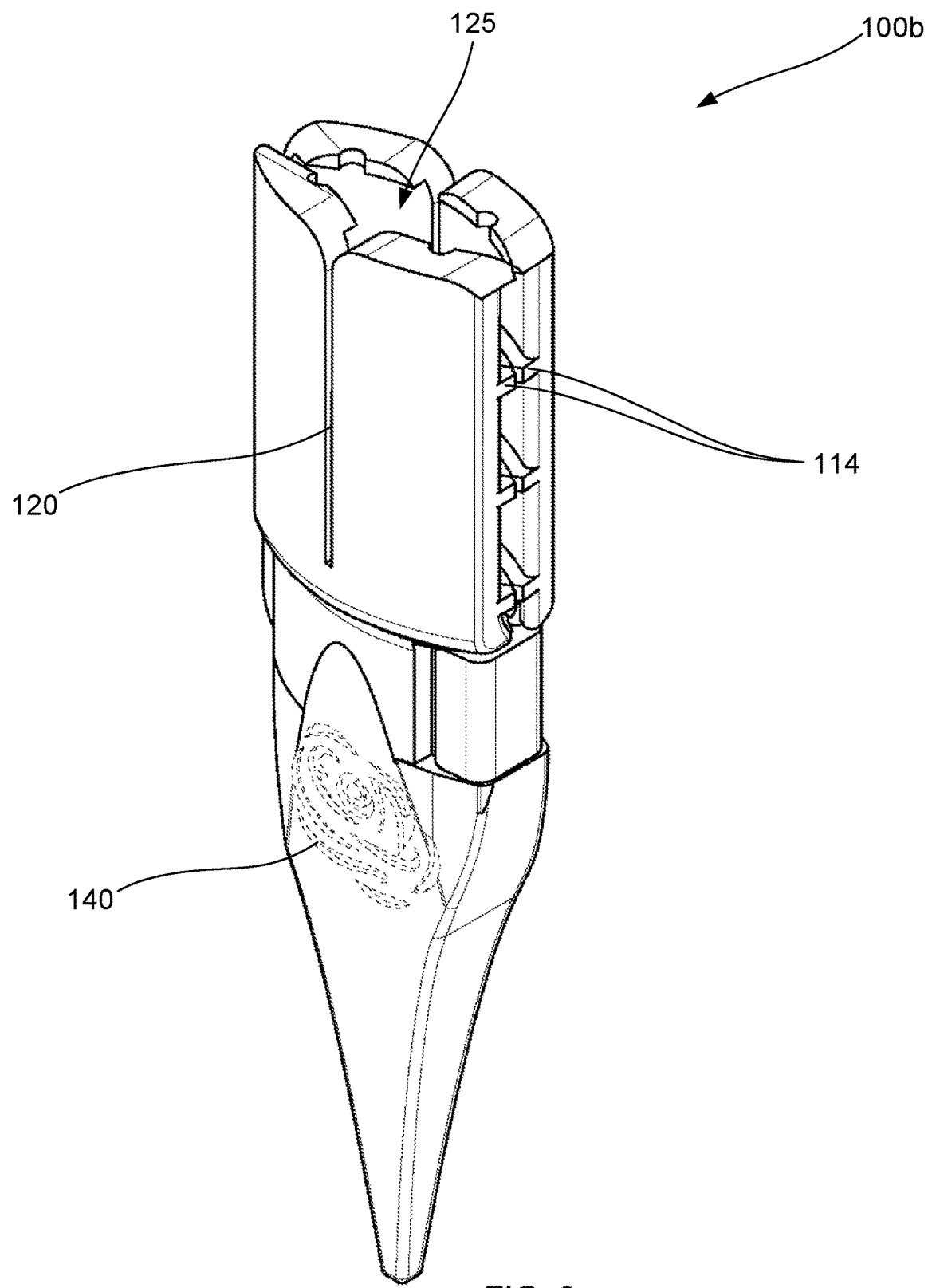
FIG. 8 illustrates the exemplary stem bayonet clip with the clip in the closed position.
Figure 9:
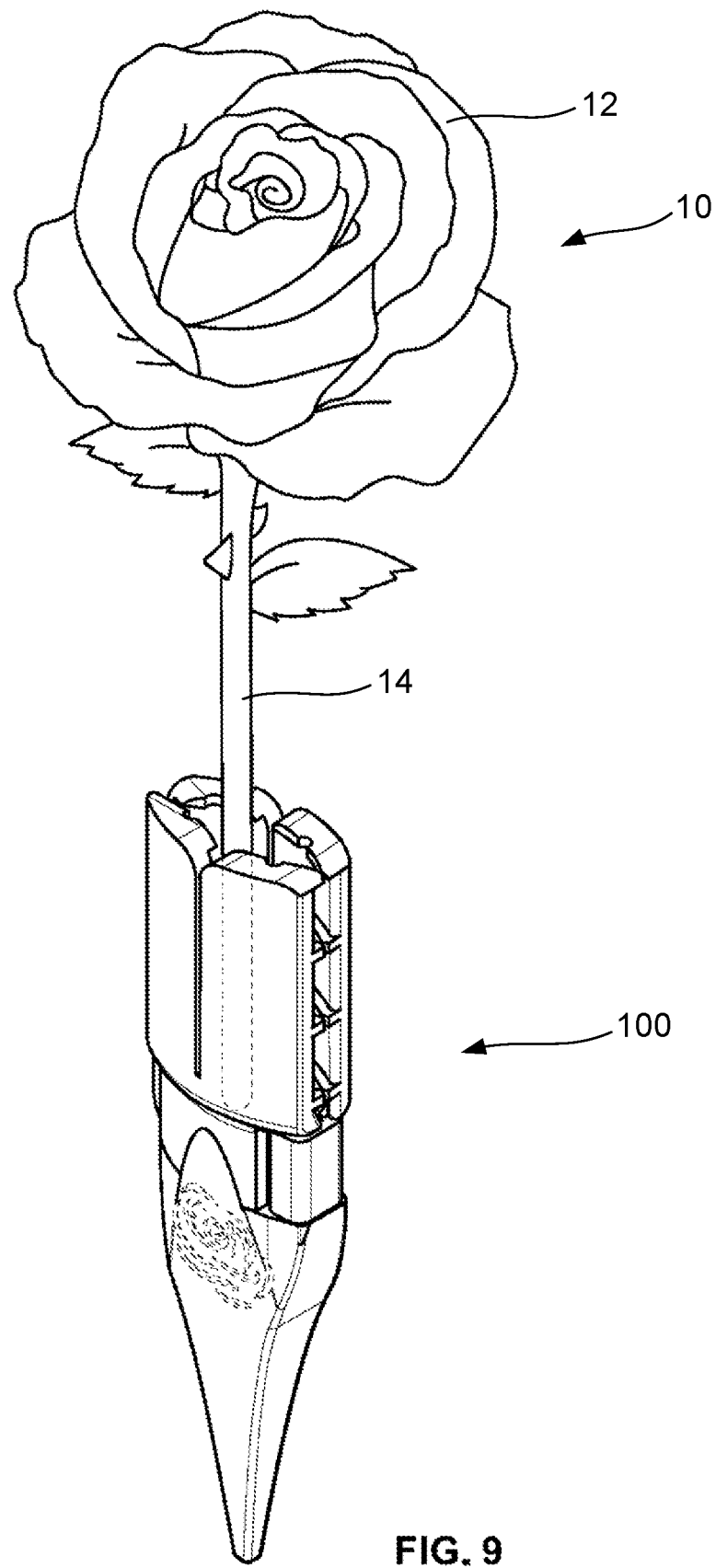
FIG. 9 illustrates the exemplary stem bayonet clip of FIG. 8 clipped around the stem portion of a flower.

The base portion 158 and bayonet are configured to anchor the system into the floral foam or a suitable floral arrangement base material that can support the weight of the floral element 10. Furthermore, it should be understood from the drawings that when outer body portions 112a and 112b are closed, such as shown in FIGS. 8-9 that the outer body portions form an aperture, and that base portion 158 is sized such that it covers the entirety of the aperture or at least a majority thereof. In this manner, no stem portion clasped between 112a and 112b can pass beyond the base portion 158. This can also be seen from the top view of FIG. 6.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention. Further, any features or aspects of a particular embodiment can be used or combined with any features or aspects of any other embodiment where appropriate.

What is claimed:

1. A stem bayonet clip comprising:
   a compression portion having a first main body portions and a second main body portion opposing the first main body portion each movable with respect to one another;
   a locking mechanism provided below the first and second main body portions, the locking mechanism configured to inhibit movement of the first and second main body portions and to retain a gradient compressive force depending on the width of a stem of a floral element inserted between the first and second main body portions;
   a first hinge connecting a section of the first main body portion to a section of the second main body portion; and
   a bayonet portion extending downward from the compression portion.

2. The stem bayonet clip of claim 1, wherein the bayonet portion further comprises a tapered tip portion configured to be inserted into a foam material.

3. The stem bayonet clip of claim 1, wherein the compression portion is provided with a plurality of compression ribs provided at varying axial heights.

4. The stem bayonet clip of claim 3, wherein each compression rib is arranged opposite an opposing compression rib provided on the opposing main body portion at a corresponding axial height.

5. The stem bayonet clip of claim 3, wherein the plurality of compression ribs are oriented in a generally horizontal direction when a tapered tip portion of the bayonet clip is inserted into a foam material.

6. The stem bayonet clip of claim 3, wherein the compression ribs further comprise one or more texture elements provided thereon.

7. The stem bayonet clip of claim 1, further comprising a first hinge connecting the opposing main body portions.

8. The stem bayonet clip of claim 7, further comprising a second hinge connecting the opposing main body portions, wherein the second hinge is provided at an upper portion of the main body portions above the first hinge.

9. The stem bayonet clip of claim 7, further comprising a flexure slot located on an exterior surface of the compression portion, wherein the flexure slot is located on the exterior surface at a location corresponding to the first hinge.

10. The stem bayonet clip of claim 1, further comprising one or more flexure slots on an exterior surface of the opposing main body portions.

11. The stem bayonet clip of claim 1, wherein the locking portion is formed near a lower portion of the compression portion.

12. The stem bayonet clip of claim 11, wherein the locking portion is configured to cause a gradient compressive force on the stem from the lower portion of the compression portion to an upper portion of the compression portion.

13. The stem bayonet clip of claim 1, wherein the stem bayonet clip comprises a deformable material.

14. The stem bayonet clip of claim 1, further comprising a gripping area configured to be gripped between fingers to facilitate the locking of the opposing main body portions.

15. The stem bayonet clip of claim 14, wherein the gripping area comprises a flat portion configured to have a design or logo.

16. A stem bayonet clip comprising:
   a compression portion having opposing main body portions movable with respect to one another;
   one or more compression features provided on an interior surface of the opposing main body portions;
   a locking mechanism provided about an edge portion of the opposing main body portions, the locking mechanism configured to inhibit movement of the opposing main body portions and to retain a compressive force applied to a stem of a floral element inserted between the opposing main body portions;
   a bayonet portion having a base portion, and
   wherein the base portion is position below the compression portion and sized to cover at least an area of an aperture formed when the opposing main body portions are in a closed or compressing state.

17. The stem bayonet clip of claim 16, wherein the one or more compression feature comprises a plurality of protruding features configured to cause a gradient compressive force on the stem from the lower portion of the compression portion to an upper portion of the compression portion.

18. The stem bayonet clip of claim 17, where the bayonet further comprises a tip portion configured to be inserted into a foam material.

19. A stem bayonet clip comprising:
   a compression portion formed from a first outer body portion and connected to a second outer body portion by a first hinge portion, whereby the second outer portion is configured to swing about and compress with the first outer body portion;
   a locking mechanism disposed below the compression portion and formed of a locking portion having a locking surface that is connected by a second hinge portion to a locking structure about a first end and configured to interferingly engage with the locking structure about a second end, wherein the locking portion is disposed below the first outer body portion and the locking structure is formed below the second outer body structure; and
   a bayonet portion extending downward from the locking portion of the locking mechanism and having a base portion disposed below the locking structure when in a closed state.

* * * * *